Patented June 20, 1950

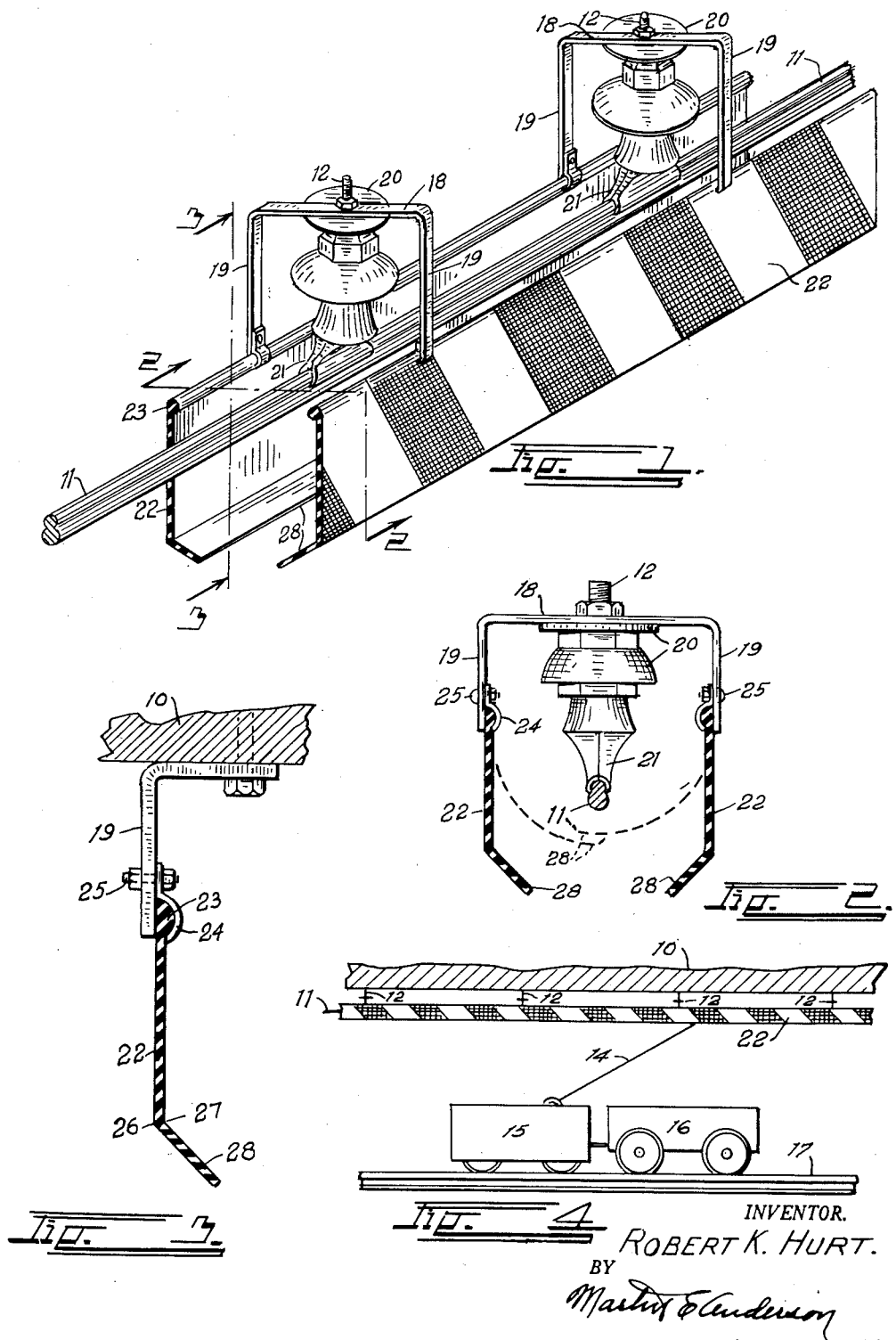

2,512,022

UNITED STATES PATENT OFFICE 2,512,022

TROLLEY WIRE GUARD FOR MINES

Robert K. Hurt, Denver, Colo., assignor to The Gates Rubber Company, Denver, Colo., a corporation of Colorado Application August 2, 1947, Serial No. 765,719

6 Claims. (Cl. 191—35)

This invention relates to guards for trolley wires in mines.

Most mines are equipped with electric locomotives for moving mine cars. Due to the rather low head room in the ordinary mines, the trolley wires are positioned so low that a man of ordinary height is unable to pass underneath them without stooping. A voltage as high as 500 volts is employed and therefore an accidental contact with the trolley wire is always dangerous and sometimes fatal.

The danger from accidental contact with trolley wires is well understood and most States have promulgated regulations concerning the installation and guarding of trolley wires.

Several kinds of trolley wire guards have been tried and are in use. Among these the most popular are the wooden guards comprising wooden boards suspended on both sides of the trolley wire, and flexible rubber sheeting draped over the trolley wire, the sheeting projecting downwardly on each side thereof. Both of these guards have objectionable features which will not be enumerated in detail. The wooden boards are hard and are easily broken. Anyone walking so as to strike these guards accidentally stands the chance of being severely bruised. The rubber sheeting being in electrical contact with the trolley wires and at the same time kept moist due to the moisture that is always present in the air, will, at times, be sufficiently conductive to subject any one coming in contact with them to a severe electrical shock.

It is the object of this invention to produce a mine trolley guard that shall possess the following properties and characteristics:

1. It must give protection against electrical shock whether it is wet or dry.

2. It must possess such physical characteristics that it will not cause injury, no matter how violently it is contacted.

3. It must be so designed and constructed that it can be easily installed on the brackets now used in connection with wooden guards.

4. Must give long service with virtually no maintenance cost.

5. Must not interfere with the trolley operation.

6. Must be of such material and design that it can be salvaged for repeated use.

7. The material must, in addition, be flame resistant.

Having thus pointed out the several objects of this invention, the invention itself will now be described in detail and for this purpose reference will be had to the accompanying drawing in which it has been illustrated and in which:

Figure 1 is an isometric view showing a section of the trolley with the guards in place adjacent the same;

Figure 2 is a transverse section taken on line 2—2, Figure 1;

Figure 3 is a section somewhat similar to that shown in Figure 2, showing one supporting bracket only; and Figure 4 is a diagrammatic view showing the position of the guards with relation to the mine's ceiling.

Referring now to the drawing, reference numeral 10 designates the roof of a mine. A trolley wire 11 is suspended from the roof by suitable means comprising insulators whose positions have been indicated by reference numeral 12, in Figure 4. The guards have been indicated by reference numeral 22 and the trolley pole by reference numeral 14. Reference numeral 15 designates an electric locomotive and reference numeral 16 one of the mine cars. The cars travel on the ordinary mine railway rails indicated by reference numeral 17. The trolley and associated parts have been shown most clearly in Figure 1 from which it will be seen that U-shaped suspending brackets having horizontal base portions 18 and downwardly extending arms 19 are supported on the upper ends of porcelain insulators which have been designated in their entirety by reference numeral 20. The insulators carry clamps 21 by means of which the trolley wire is supported. Guard members 22 are suspended from the lower ends of the brackets in a manner shown in Figure 3 from which it will be noticed that the guard members have their upper edges provided with a thickened portion or rib 23 that is engaged by means of the curved clamp 24 held in place by means of a bolt 25. The guard 22 is usually constructed from a heavy fabric coated on the outside with rubber composition that has good insulating properties. The distance from the top of the guard to the point indicated by reference numeral 26 is usually approximately four inches. A strip about two inches wide is bent along line 27 so as to project inwardly as shown in the drawing. These inwardly inclined edge portions have been designated by reference numeral 28.

The parts are so proportioned that when the guards are bent inwardly from the full line to the dotted line position shown in Figure 2, the inclined edge portions 28 will overlap the trolley. In Figure 2 the guards on both sides of the trolley wire have been shown as bent inwardly. Of course this does not occur simultaneously except under very unusual circumstances. However, whichever one of the guards is bent inwardly will overlap the trolley wire in the manner indicated so that if one of the workers passing underneath the trolley wire should happen to strike the guard with his head, instead of being injured by the guard, as would be the case if it were rigid, the guard will bend inwardly pivoting about the lower edge of bead 23 and will automatically cover the trolley wire at that point, thereby assuring that the person will be protected against an electric shock.

The flexible highly insulating guards shown on the drawing and described herein may be easily removed and used in other positions because they are practically indestructible and are held in place by readily removable clamps.

Attention is called in particular to the bead 23 and to the preformed bend along line 27. By employing a bead it is possible to attach the guard to the supporting brackets at any point along the bead, thereby obviating the necessity of carefully spacing the supporting brackets. The preformed angular relation between part 28 and the other part of the guard assures that the trolley wire will be completely covered on two sides as shown in Figure 2. The preformed angular relation of the two flat portions of the guard gives it an increased lateral rigidity over a flat strip of the same material.

The outer surface of the guards are painted with alternate black and white stripes which has come to indicate caution or danger and this striped effect is quite readily visible in light that would be too dull to observe a monochromatic surface.

The specific construction of the hangers may be varied to suit the conditions where the guards are used, and any other supporting means can be employed. The reason for showing supports like those illustrated is that in the first place they are very suitable for the purpose under consideration and that very similar supports are used today in connection with guards having boards or planks instead of the flexible guard shown here.

Particular attention is called to the specific relationship of the parts, namely, the width of the guards is so proportioned relative to the points from which it is suspended and to the position of the trolley wire that when they are accidentally or purposely bent inwardly, the angle edge portions 28 will overlap the trolley wire. This assures a quite complete insulation between the trolley wire and any object that is in contact with the outer surface of the guard.

The fabric inner surface of the guards serves to give them rigidity and prevent undue sag in between the supports. The rib or ridge 23 is provided so as to cooperate with the curved clamps 24 to securely hold the guards in adjusted position.

Having described the invention, what is claimed as new is:

1. A trolley wire guard adapted to depend from a plurality of longitudinally spaced supports adjacent a trolley wire, comprising; a strip of flexible electrical insulating material having substantially parallel edges, a continuous thickened portion on said guard adjacent the upper edge thereof for resisting the tendency of the strip to sag between supports and which may be engaged by a fixed support at all positions therealong so that the strip may be stretched between supports to remove sag, and the other edge of the strip having a continuous portion disposed angularly with respect to the portion between the edges, forming a V-shaped channel into which a trolley wire may nest when the strip is distorted to a position beneath a trolley wire.

2. A guard in accordance with claim 1 wherein at least one side of the strip is reinforced by a fabric covering bonded thereto.

3. A guarded trolley wire assembly comprising, a trolley wire supported from a ceiling or the like, a row of support brackets positioned at fixed distances apart along each side of the trolley wire, the brackets having clamp means thereon, a guard strip of flexible insulating material suspended from each row of brackets by the clamp means, and means on the guard strip having uniform cross section throughout the length thereof, engageable by the clamping means at any point therealong, the construction being such that when the clamping means are loosened the guard strips may be slid longitudinally relative to the fixed brackets to remove sag from the strip.

4. An assembly in accordance with claim 3 wherein the means having uniform cross section comprises a bead parallel with the upper edge of each flexible member about which the clamping means partially extends.

5. An assembly in accordance with claim 3 wherein the guard strip is formed of two planar portions to form a V channel at their juncture, the V channel being so arranged relative to the brackets and trolley wire that when a strip is bent upwardly, the trolley wire nests at the juncture with both sides of the trolley wire protected from touching from a point therebelow.

6. An assembly in accordance with claim 3 wherein the means having uniform cross section comprises a bead parallel with the upper edge of each flexible member about which the clamping means extends, and each strip has upper and lower planar portions disposed at an obtuse angle relative to each other, the lower planar portion being adapted to cover the side of the trolley wire remote from the side thereof from which the strip is supported when bent upwardly beneath the trolley wire.

ROBERT K. HURT.

REFERENCES CITED

The following references are of record in the file of this patent:

UNITED STATES PATENTS

| Number | Name | Date |
| --- | --- | --- |
| 1,099,744 | Gonia | June 9, 1914 |
| 1,201,321 | McCausland | Oct. 17, 1916 |
| 1,859,599 | Quinn | May 24, 1932 |
| 2,151,099 | Groendyk | Mar. 21, 1939 |
| 2,226,225 | Hall et al. | Dec. 24, 1940 |